Patented Mar. 16, 1943

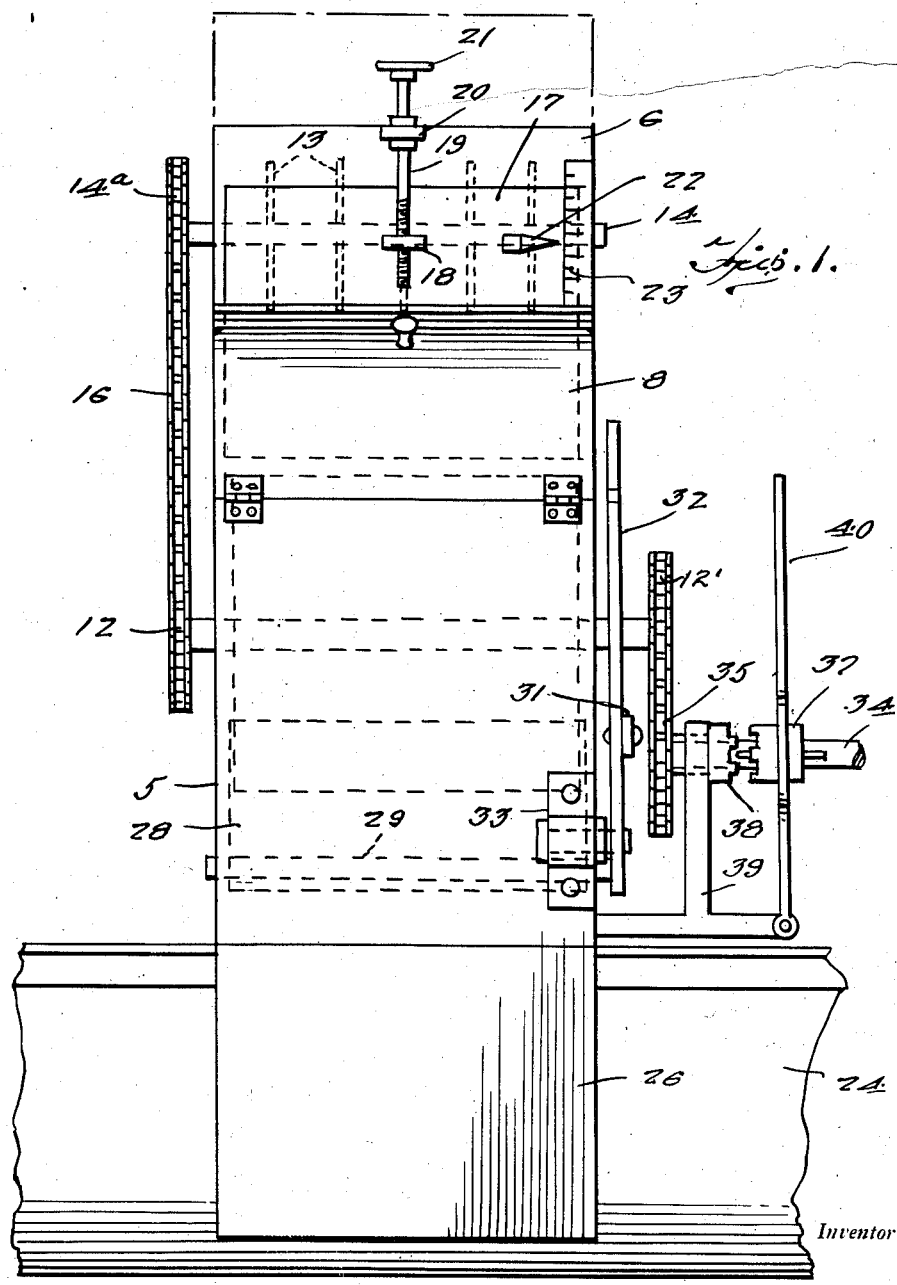

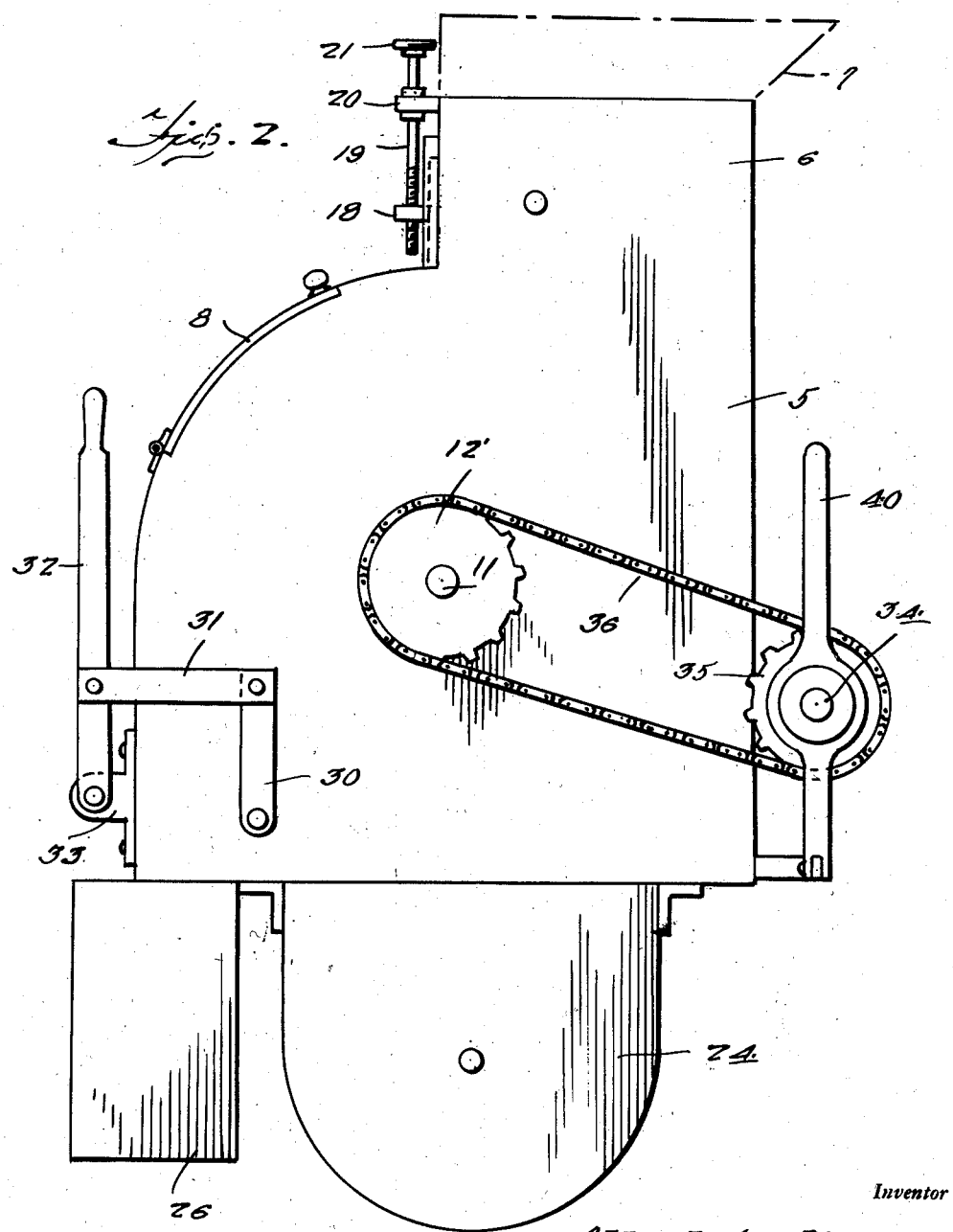

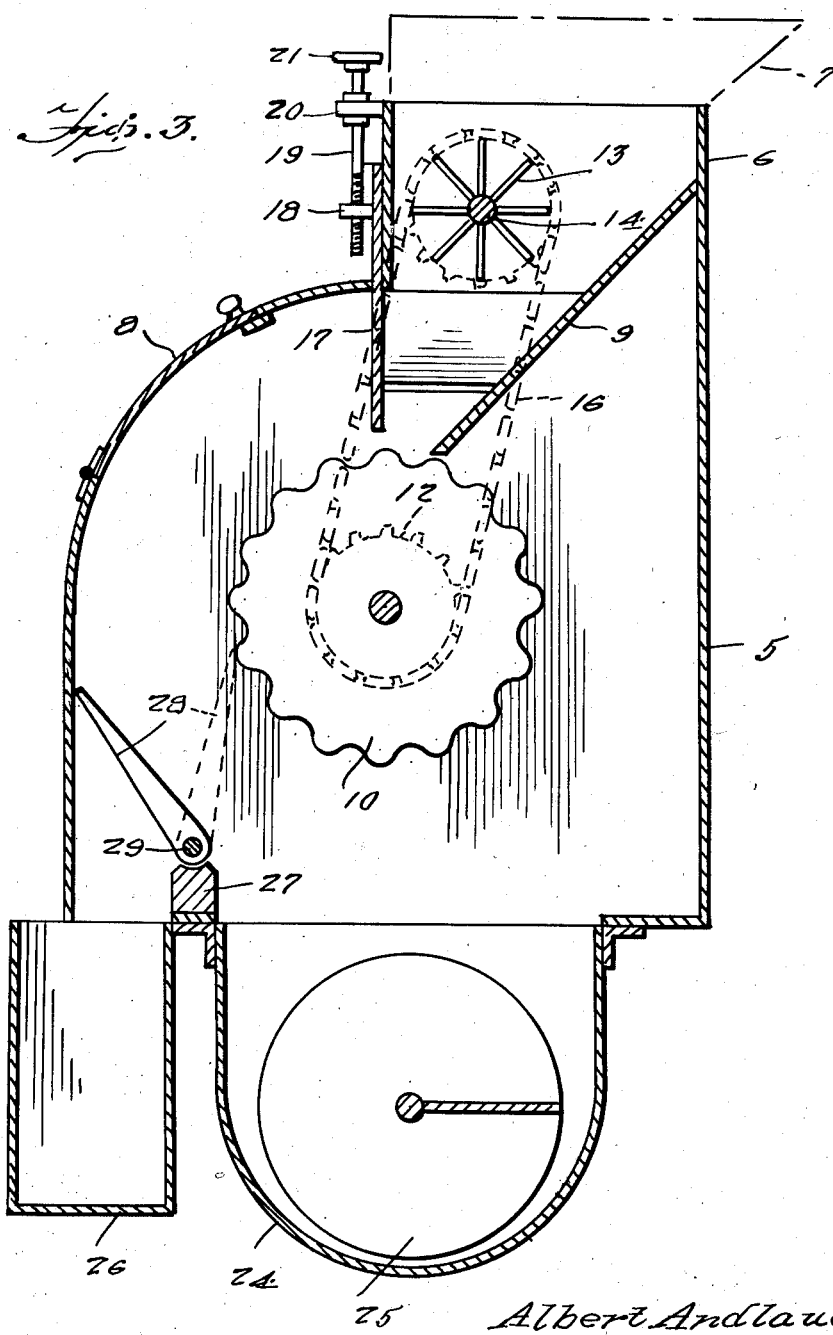

2,313,715

UNITED STATES PATENT OFFICE 2,313,715

VOLUME METER AND SAMPLER

Albert Andlauer, Wilmington, Del.

Application October 10, 1941, Serial No. 414,513

4 Claims. (Cl. 73—21)

This invention relates to new and useful improvements in volume measuring apparatus and more particularly to a machine especially adapted for use in conjunction with the feed mechanisms of mills.

The principal object of the invention is to provide an apparatus which will efficiently measure the quantity of feed and wherein mixing means is included for always maintaining the material in fluent condition.

Another important object of the invention is to provide a volume meter from which samples can be conveniently taken from time to time to determine the nature and condition of the material being handled.

Other objects and advantages of the invention will become apparent to the reader of the following description.

In the drawings:

Figure 1 represents a front elevational view of the machine.

Figure 2 is a side elevational view of the right side of the machine.

Figure 3 is a vertical sectional view through the machine.

Referring to the drawings wherein like numerals designate like parts, it can be seen that numeral 5 denotes a case, the upper portion of which is reduced and extends upwardly to define an inlet neck 6 which connects in any suitable manner to a feed hopper 7 of conventional design.

The upper portion of the front wall of the case 5 is curved and has an inspection door 8 therein.

Extending from a point well up in the neck 6, an inclined chute 9 terminates at its lower edge just above a corrugated drum 10 located on a shaft 11, one end of which extends through one side of the case 5 and is equipped with a sprocket wheel 12.

An agitator 13 carried by a shaft 14 is located in the space of the neck 6 above the chute 9 and one end of this shaft 14 extends through one side wall of the case 5 and is equipped with a sprocket wheel 14a. A sprocket chain 16 is trained over the sprocket wheels 12 and 14a.

A vertically slidable baffle plate 17 is movable through a slot in the upper portion of the front wall of the case 5, the upper portion of this plate 17 being provided with a lug 18 having a threaded opening for receiving an adjusting screw 19, this adjusting screw 19 being swivelled through a lip 20 on the upper portion of the neck 6. A head 21 is provided for the upper end of the adjusting screw 19. As can be seen in Figure 1, a pointer 22 is provided on the baffle plate 17 and this is cooperative with a scale 23 on the front wall of the neck 6. Thus by looking at the pointer 22 and scale 23 the position of the baffle plate 17 in the meter can be ascertained. As can be seen in Figure 3, the feed is directly onto the drum 10 between the lower end of the chute 9 and the lower end of the baffle 17.

As is obvious, a number of these meters can be arranged in a line and over a trough 24 which has a distributing conveyor 25 therein.

Each meter has a test box 26 which is suitably secured in place under the forward portion of the case 5. A cleat 27 extends upwardly from the bottom of the case 5 between the test box 26 and the trough 24 and has a swingable gate 28 just above the same. This gate 28 is carried by the shaft 29, one end of which extends through one side of the case 5 and is equipped with an arm 30 which is connected by a pivotal link 31 to a hand lever 32 pivotally mounted on a bracket 33 at the front side of the case 5.

Obviously, when it is desired to make a test of the material passing through the meter so that proper adjustment can be made if necessary, the hand lever 32 is moved inwardly which, of course, will throw the gate 28 to the dotted line position shown in Figure 3, permitting the material to pass into the test box 26 where it can be inspected, and if found satisfactory, the lever 32 can be moved outwardly resulting in the positioning of the gate 28 in a position preventing further material entering the test box 26.

Numeral 34 is the power shaft which may be used for a number of meters constructed in accordance with the above description and for each of these meters a sprocket wheel 35 is provided on the drive shaft 34 and rotatable relative thereto. Extending from the sprocket wheel 35 and to the sprocket wheel 12' on the shaft 11 of the meter is a sprocket chain 36. The drive shaft 34 is provided with a splined and toothed collar 37 which when in mesh with a toothed collar 38 connected with the sprocket wheel 35 through a bearing 39 will connect the drive shaft 34 with the sprocket wheel 35 for the operation of the meter. However, by shifting the pivotal lever 40 connected to collar 37, the collar 37 can be removed from the collar 38 to the end that the machine will cease operation.

In the operation of the machine, the supply enters the top of the machine through the neck 6 where it is agitated by the agitator 13 and broken up if lumpy and slides down the chute 9 onto the drum 10. The drum which is rotating again agitates the feed, the drum throwing the feed against the gate 28 on which it slides downwardly into the trough 24, should of course the gate 28 be in position shown in Figure 3. If the gate is in the opposite position as shown in broken lines in Figure 3, of course, the feed will be diverted into the test box 26.

While the foregoing specification sets forth the invention in specific terms, it is to be understod that numerous changes in the shape, size and materials may be resorted to without departing from the spirit and scope of the invention as claimed hereinafter.

Having described the invention, what is claimed as new is:

1. A feed meter of the character described comprising a case, an inlet at the top of the case, an agitator in the inlet, an overshot feed moving drum rotatably mounted in the case, a conveyor trough underlying the case and having communication with the interior thereof, a test box located adjacent the trough, and a gate for diverting feed from said drum either into the trough or the test box.

2. A feed meter of the character described comprising a case, an inlet at the top of the case, an agitator in the inlet, a feed moving drum rotatably mounted in the case, a conveyor trough underlying the case and having communication with the interior thereof, a test box located adjacent the trough, and a gate for diverting feed from said drum either into the trough or the test box, and an adjustable baffle for regulating the flow of feed onto the drum.

3. A feed meter of the character described comprising a case, an inlet at the top of the case, an agitator in the inlet, a feed moving drum rotatably mounted in the case, a conveyor trough underlying the case and having communication with the interior thereof, a test box located adjacent the trough, and a gate for diverting feed from said drum either into the trough or the test box, and an adjustable baffle for regulating the flow of feed onto the drum, and a gauge for determining the internal position of the baffle.

4. A feed meter of the character described comprising a case, an inlet at the top of the case, an agitator in the inlet, an overshot feed moving drum rotatably mounted in the case, a conveyor trough underlying the case and having communication with the interior thereof, a test box located adjacent the trough, and a gate for diverting feed from said drum either into the trough or the test box, and an inspection door for the case whereby the drum can be inspected.

ALBERT ANDLAUER.